United States Patent
Gunbas et al.

(10) Patent No.: US 10,589,471 B2
(45) Date of Patent: Mar. 17, 2020

(54) TRANSLUCENT LASER WELDABLE THERMOPLASTIC COMPOSITIONS AND LASER-WELDED PRODUCTS

(71) Applicant: SABIC GLOBAL TECHNOLOGIES B.V., Bergen op Zoom (NL)

(72) Inventors: Deniz Duygu Gunbas, Bergen op Zoom (NL); Hendrikus Petrus Cornelis van Heerbeek, Bergen op Zoom (NL); Bart Vandormael, Bergen op Zoom (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 42 days.

(21) Appl. No.: 16/060,209

(22) PCT Filed: Nov. 29, 2016

(86) PCT No.: PCT/EP2016/079092
§ 371 (c)(1),
(2) Date: Jun. 7, 2018

(87) PCT Pub. No.: WO2017/097630
PCT Pub. Date: Jun. 15, 2017

(65) Prior Publication Data
US 2019/0337239 A1    Nov. 7, 2019

Related U.S. Application Data

(60) Provisional application No. 62/264,625, filed on Dec. 8, 2015.

(51) Int. Cl.
| | | |
|---|---|---|
| B29C 65/00 | (2006.01) |
| B29C 65/16 | (2006.01) |
| C08G 63/183 | (2006.01) |
| C08G 63/672 | (2006.01) |
| C08G 64/04 | (2006.01) |
| C08K 3/20 | (2006.01) |
| C08K 5/00 | (2006.01) |
| C08K 7/14 | (2006.01) |
| B29K 67/00 | (2006.01) |
| B29K 69/00 | (2006.01) |

(52) U.S. Cl.
CPC .......... B29C 66/71 (2013.01); B29C 65/1616 (2013.01); B29C 65/1635 (2013.01); B29C 65/1677 (2013.01); B29C 66/1122 (2013.01); B29C 66/73773 (2013.01); B29C 66/73921 (2013.01); C08G 63/183 (2013.01); C08G 63/672 (2013.01); C08G 64/04 (2013.01); C08K 3/20 (2013.01); C08K 5/005 (2013.01); C08K 7/14 (2013.01); B29K 2067/003 (2013.01); B29K 2067/006 (2013.01); B29K 2069/00 (2013.01)

(58) Field of Classification Search
CPC ................ B29C 66/71; B29C 66/1122; B29C 66/73773; B29C 66/73921; B29C 65/1616; B29C 65/1635; B29C 65/1677; C08G 63/183; C08G 63/672; C08G 64/04; C08K 3/20; C08K 5/005; C08K 7/14
See application file for complete search history.

(56) References Cited

U.S. PATENT DOCUMENTS

| | | | |
|---|---|---|---|
| 6,447,859 B2 * | 9/2002 | Oguro ................. | C08G 63/672 428/35.7 |
| 7,396,428 B2 | 7/2008 | Matsushima et al. | |
| 8,318,843 B2 | 11/2012 | Benten et al. | |
| 8,791,179 B2 | 7/2014 | Von Benten et al. | |
| 8,889,768 B2 | 11/2014 | Von Benten et al. | |
| 9,453,127 B2 | 9/2016 | Iwasaki et al. | |
| 2005/0165176 A1 | 7/2005 | Matsushima et al. | |
| 2007/0129475 A1 | 6/2007 | Sakata et al. | |
| 2011/0256406 A1 | 10/2011 | Farrell et al. | |

(Continued)

FOREIGN PATENT DOCUMENTS

| | | |
|---|---|---|
| JP | 2005133087 A1 | 5/2005 |
| JP | 2005146218 A | 6/2005 |

(Continued)

OTHER PUBLICATIONS

International Serch Report for International Application No. PCT/EP2016/079092; International Filing Date: Nov. 29, 2016; dated Feb. 2, 2017; 5 Pages.
Machine Translation of JP2005133087A; Date of Publication: May 26, 2005; 35 Pages.
Machine Translation of JP2005146218; Date of Publication: Jun. 9, 2005; 13 Pages.
Machine Translation of JP2013222130; Date of Publication: Oct. 28, 2013; 26 Pages.
Machine Translation of JP2014205773; Date of Publication: Oct. 30, 2014; 10 Pages.

(Continued)

Primary Examiner — Daniel McNally
(74) Attorney, Agent, or Firm — Cantor Colburn LLP

(57) ABSTRACT

The invention is directed to a thermoplastic resin composition comprising: ●from 10 to 80 weight percent of a partially crystalline polyester component selected from the group consisting of terephthalate-derived polyesters, naphthalate-derived polyesters, succinate-derived polyesters, and furanoate-derived polyesters; or combinations thereof; ●from 1.5 to 40 weight percent of an amorphous high heat copolyester resin component that is produced by polymerizing a monomer mixture comprising a mixture of spiroglycol, ethylene glycol and terephthalic acid and or an ester thereof (SPG PET) and having a glass transition temperature ($T_g$) of 85 to 130° C.; and ●from 0.01 to 5 weight percent of an antioxidant, mold release agent, stabilizer, or a combination thereof.

20 Claims, No Drawings

(56) References Cited

U.S. PATENT DOCUMENTS

| | | | |
|---|---|---|---|
| 2011/0288220 A1 | 11/2011 | Benten et al. | |
| 2011/0306707 A1 | 12/2011 | Benten et al. | |
| 2012/0183778 A1 | 7/2012 | Farrell et al. | |
| 2014/0179855 A1* | 6/2014 | Farrell | C08L 67/02 |
| | | | 524/494 |

FOREIGN PATENT DOCUMENTS

| | | | |
|---|---|---|---|
| JP | 2013155279 A | 8/2013 | |
| JP | 2013222130 A | 10/2013 | |
| JP | 2014205773 A | 10/2014 | |

OTHER PUBLICATIONS

Perstorp, "Sparkling alternative to polycarbonate, polystyrene & glass," https://www.perstorp.com/en/products/plastic_materials/%20heat_resistant_plastic; Date Accessed: Jun. 6, 2018; 2 Pages.

Written Opinion of the International Searching Authority for International Application No. PCT/EP2016/079092; International Filing Date: Nov. 29, 2016; dated Feb. 2, 2017; 5 Pages.

* cited by examiner

TRANSLUCENT LASER WELDABLE THERMOPLASTIC COMPOSITIONS AND LASER-WELDED PRODUCTS

CROSS REFERENCE TO RELATED APPLICATIONS

This application is a 371 of International Application No. PCT/EP2016/079092, filed Nov. 29, 2016, which claims priority to U.S. Ser. No. 62/264,625 filed Dec. 8, 2015, which are incorporated herein by reference in their entirety.

FIELD OF THE INVENTION

The invention is directed to glass filled semicrystalline polymer compositions that contain a spiroglycol modified poly(ethylene terephthalate) (SPG PET) copolyester resin. The compositions have increased transparency to NIR laser light without significantly impaired mechanical and thermal performance. Materials with such high NIR transmission provide processing advantages, in particular short cycle times. Excellent surface aesthetics, color depth and visual special effects are possible with the present invention as a result of improved clarity and transparency of glass filled blends. The invention is also directed to a process for welding a first article including a laser-transmissive resin composition as described herein and a laser light absorbing thermoplastic article. The laser-welded product of the present invention can be obtained by applying laser radiation to the first article being in physical contact with at least a portion of the surface of the second article, the process further involving applying NIR laser radiation to the first article such that radiation passes through the first article and being absorbed by the second part so that sufficient heat is generated to effectively weld the first article to the second article.

BACKGROUND OF THE INVENTION

Laser transmission welding is an established joining technology in many industries, including automotive engineering, electric and electronic industries. Laser welding is used to produce a wide range of products such as polymer system components, distance sensors, electronic vehicle security key systems, audio devices or blood pressure gauges.

Fiber-glass reinforced semi-crystalline polymers exhibiting high transparency to NIR laser light with their high heat performance, excellent chemical resistance and mechanical properties are potential candidates for the aforementioned applications. As a general tendency, the higher the degree of crystallinity, the higher the mechanical strength, heat resistance and chemical resistance. However, semi-crystalline polymers tend to scatter light due to coexistence of the amorphous and crystalline phases. Furthermore, incorporation of reinforcing agents such as glass fibers into the polymer matrix significantly decreases the level of NIR transmission due to increased light scattering. Consequently, transmission laser welding with fiber-glass reinforced semi-crystalline materials is hard to achieve and existing material solutions are limited to slow scan speeds, which is not very attractive, as it prolongs part assembly cycle time. Besides, the NIR transmission of a PBT based material is highly sensitive to processing conditions and variations in the composition. Therefore, robust manufacturing of laser transmission weldable glass filled blend compositions containing crystalline PBT is still a challenge.

The principle of transmission welding depends on the different optical properties of the polymers to be welded. A transparent and an absorbing part are positioned and clamped in an overlap configuration with the transparent part facing the laser radiation. A laser beam penetrates through the laser-transparent part with minimal loss of energy and is absorbed by the laser-absorbing part, which subsequently heats up and melts. Heat transfer through conduction leads to melting of both parts, thus generating a weld at the interfacial zone. For laser transmission welding, it is very important to achieve a sufficient and consistent heating of the polymers at the joint interface during pre-melt and fusion phase. The magnitude of the deposited energy at the interface can be controlled to some extent by adjusting laser welding conditions (laser beam power, welding speed, laser beam/spot diameter, clamp pressure) but depends largely on the polymer properties.

Poly(butylene terephthalate) (PBT) provides processing latitude in injection molding and in extrusion techniques owing to its high flow when molten and rapid crystallization upon cooling. Rapid crystallization offers processing advantage, particularly quick demoldability and short cycle times. Additionally, PBT offers excellent mechanical and electrical properties with robust chemical resistance, which is among key requirements for various industrial sectors including automotive, electric and electronic industries. Improved thermal resistance gained by reinforcing PBT resins with glass fibers make them outstanding candidates for applications in which the products are subjected to short-term heat exposure.

A potential problem with welding materials based on semi-crystalline polymers is that such resins scatter light due to coexistence of the amorphous and crystalline phases. Back scattering results in a reduction in the total amount of transmitted energy, whereas diffuse scattering leads to broadening of the laser beam. Consequently, the level of the laser energy arriving at the interface is diminished, thus decreasing the adhesion between the parts to be welded. In order to arrive at an acceptable weld strength in these low NIR transmitted materials welding speeds have to be reduced causing on significant increase in assembly cycle time. Incorporation of reinforcing agents such as glass fibers into the PBT resin significantly decreases the level of NIR transmission due to increased light scattering. Another potential problem with internal scattering of the laser light, especially in thick-welded parts, is that a significant rise in temperature can occur which may lead to weld instabilities. Hence, materials with high thermal resistance are highly preferred as transparent (upper) layer in laser welding applications. It is therefore desirable to combine thermal resistance and excellent mechanical properties of glass filled semi-crystalline materials with high laser transparency. To this end, there has been a strong demand for glass-fiber reinforced PBT with high and constant transparency to the NIR laser light. Constant laser transparency across a range of thicknesses and processing conditions is essential for consistent weld strengths.

One approach aiming at increasing the laser transparency is based on refractive indices matching of the amorphous polymer and crystalline PBT, and also of the fillers. For instance, JP2005/133087 discloses a resin composition incorporating PBT, PC, elastomer and high-refractive index silicone oil. However, the increase in transmission in the NIR region achieved results in the loss of mechanical properties.

Alternatively, speeding up the crystallization rate of PBT by employing a nucleating agent, results in improved laser transparency. Examples of such compositions are found in U.S. Pat. Nos. 8,889,768, 8,791,179, and 8,318,843. This is achieved by a chemical reaction between the nucleating agent and polymeric end groups of PBT to produce ionic end groups, which increases the rate of crystallization. Nevertheless, such chemical nucleation agents have disadvantages because they can significantly degrade many of the amorphous materials used in PBT blends such as polycarbonates and polyester carbonates. The outcomes of such degradations are unstable melt viscosities and deformations due to turbulent flow (splay and jetting). Another disadvantage of very quick crystallization induced by nucleating agents is the tendency to freeze stresses into the part, which can result in warpage.

Another approach to increase transparency of PBT is based on blending PBT with an amorphous polyester polycarbonate. Such compositions are disclosed in U.S. Patent Publ. No. 2011/0256406, DE 10230722 (U.S. Patent. No. 20070129475), U.S. Patent No. 20050165176 and U.S. Pat. No. 7,396,428.

In addition, it has been disclosed in US Patent Publication No. 2014-0179855 that near-infrared transparency (800-2500 nm) of the glass filled polymer blend containing crystalline or semi-crystalline polymer and amorphous polymers is significantly improved upon replacement of the amorphous phase having a total Fries content of less than 100 ppm by an amorphous phase with a total Fries content of 5400 ppm, as produced by melt polymerization. Nevertheless, the main problem of such compositions is the inconsistent transparency in the area where laser light operates.

In view of the above and the challenges involved, there has been a strong demand to achieve improved NIR transmission for laser weldable blends, particularly glass filled polycarbonate/poly(butylene terephthalate) (PC/PBT) blends, that offer heat resistance. Even though there are examples of blends that display the specified characteristics with respect to laser welding, these solutions still leave something to be desired—not only because of the intrinsically low laser transparency of the material, but also because of the difficult-to-control consistency of this property upon manufacturing/production of the materials.

SUMMARY OF THE INVENTION

The present invention has been developed in view of the aforementioned problems in the prior art, and is intended to provide resin compositions such as polycarbonate/poly(butylene terephthalate) (PC/PBT) resins with high and constant laser transparency that possess excellent thermal properties. The laser welding characteristic of the resin can be significantly improved upon addition of an amorphous high heat copolyester having produced by polymerizing a monomer mixture comprising of a mixture of spiroglycol, ethylene glycol and terephthalic acid and/or an ester thereof (SPG PET).

In one aspect, the invention is directed to a thermoplastic resin composition comprising:
from 10 to 80 weight percent of a partially crystalline polyester component selected from the group consisting of poly(butylene terephthalate, poly(ethylene terephthalate), poly(butylene terephthalate) copolymers, and poly(ethylene terephthalate) copolymers, or combinations thereof;
from 1.5 to 40 weight percent of an amorphous high heat copolyester resin component that is produced by polymerizing a monomer mixture comprising a mixture of spiroglycol, ethylene glycol and terephthalic acid and or an ester thereof (SPG PET) and having a glass transition temperature ($T_g$) of 85 to 130° C.; and
from 0.01 to 5 weight percent of an antioxidant, mold release agent, stabilizer, or a combination thereof.

The use of amorphous SPG PET, which is miscible with both PC and PBT polymers, in the compositions of the present invention advantageously provides increased transparency to NIR light in molded, laser-transmitting parts compared to natural resin. Accordingly, compositions of the present invention can unexpectedly facilitate the laser welding of articles at desirable weld speeds with relatively low laser power. Furthermore, compositions for laser welding of the present invention have afforded consistent high weld strength without significantly impairing the physical properties in comparison with natural resin. Besides, by tailoring the SPG PET content in the polymer matrix to the appropriate refractive index that is equivalent to the refractive index of the glass being dispersed in, transparent or translucent glass filled thermoplastic compositions were achieved.

The compositions disclosed herein, all of which include SPG PET as a component, exhibit high NIR transparency as represented by a 20% or more transmission at 980 nm compared to natural resin composition, and a heat deflection temperature (HDT) of at least 90° C. (1.8 MPa). The HDT may for example be determined in accordance with ISO 75, in particular ISO 75-2, 2013, method A. Laser weldable compositions of the present invention consist of a product made by blending combination of a semi-crystalline polymer PBT (from 10 to 60 weight %), amorphous phenol end-capped LEXAN™ polycarbonate (from 10 to 50 weight %) having an aryl hydroxyl end-group content of greater than 350 ppm, prepared by melt polymerization, amorphous polyester produced by polycondensation of a monomer mixture comprising of diol component containing spiroglycol and ethylene glycol (in a molar ratio of 45 to 55, respectively) and dicarboxylic acid component containing dimethyl terephthalate (from 0.1 to 40 weight %), glass fibers (from 5 to 50 weight %) and antioxidant, mold release agent, stabilizer, or a combination thereof (0.1 to 5 weight %). The present composition can further optionally comprise other amorphous polycarbonates such as linear or branched polycarbonate homo-polymers, copolymers, and, polyester carbonate copolymers or copolyester derivatives.

DETAILED DESCRIPTION OF THE INVENTION

As used herein, the singular forms "a," "an," and "the" include plural referents. The term "combination" is inclusive of blends, mixtures, alloys, reaction products, and the like. Unless defined otherwise, technical and scientific terms used herein have the same meaning as is commonly understood by one of skill. Compounds are described using standard nomenclature. The term "and a combination thereof" is inclusive of the named component and/or other components not specifically named that have essentially the same function.

Partially Crystalline Polyester Component

The composition comprises a partially crystalline polyester component. The partially crystalline polyester component is polyester or a mixture of polyesters selected from the group consisting of terephthalate-derived polyesters, naphthalate-derived polyesters, succinate-derived polyesters, and furanoate-derived polyesters. Such polyesters include, but are not limited to, poly(ethylene terephthalate) (PET), poly (1,4-butylene terephthalate) (PBT), PBT made from recycled PET, poly(ethylene naphthalate) (PEN), poly(butylene naphthalate) (PBN), poly(1,3-propylene terephthalate) (PPT), and poly(cyclohexylenedimethylene terephthalate) (PCT), polytrimethylene terephthalate (PTT), poly (1,4-butylene succinate) (PBS), glycol modified polycyclohexylenedimethylene terephthalate (PCTG) or glycol-modified polyethylene terephthalate (PETG), poly(1,4-cyclohexylenedimethylene) 1,4-cyclohexanedicarboxylic acid (PCCD), polyethylenefuranoate (PEF), or combinations thereof.

In one embodiment, the polyester is PET, PBT, PBT made from recycled PET, PCT, or PCTG. Even more particularly, the terephthalate derived polyester is PBT. In a further embodiment, the partially crystalline polyester component selected from the group consisting of poly(butylene terephthalate, poly(ethylene terephthalate), poly(butylene terephthalate) copolymers, and poly(ethylene terephthalate) copolymers, or combinations thereof.

It is particularly preferred that the partially crystalline polyester component in the thermoplastic resin composition according to the present invention is poly(butylene terephthalate).

In a further embodiment, the polyester is a PBT having a molecular weight of 115,000 g/mol, using polystyrene standards and an intrinsic viscosity of 1.2 $cm^3/g$. Such a PBT is sold by SABIC Innovative Plastics as PBT 315. In another embodiment, the polyester is a PBT having a molecular weight of 66,000 g/mol, using polystyrene standards and an intrinsic viscosity of 0.66 $cm^3/g$ as measured in a 60:40 mixture of phenol/tetrachloroethane. Such a PBT is sold by SABIC Innovative Plastics as PBT 195. In another embodiment, the PBT is a mixture of PBT 315 and PBT 195.

In one embodiment, the composition comprises from 1 to 80 percent by weight of the partially crystalline polyester component. In a further embodiment, the composition contains from 5 to 75 percent by weight of the partially crystalline polyester component. In a further embodiment, the composition contains from 10 to 70 percent by weight of the partially crystalline polyester component. In a further embodiment, the composition contains from 15 to 65 percent by weight of the partially crystalline polyester component. In a further embodiment, the composition contains from 20 to 60 percent by weight of the partially crystalline polyester component. In a further embodiment, the composition contains from 30 to 60 percent by weight of the partially crystalline polyester component. In a further embodiment, the composition contains from 25 to 55 percent by weight of the partially crystalline polyester component. In a further embodiment, the composition contains from 30 to 40 percent by weight of the partially crystalline polyester component. In these and other embodiments, the partially crystalline polyester component is PBT, such as PBT having a molecular weight of 66,000 g/mol, using polystyrene standards and an intrinsic viscosity of 0.66 $cm^3/g$ as measured in a 60:40 mixture of phenol/tetrachloroethane.

Amorphous High Heat Copolyester Resin Component

In addition to the partially crystalline polyester component, the composition also comprises an amorphous high heat copolyester resin component. The amorphous high heat copolyester resin is typically a spiroglycol modified poly(ethylene terephthalate) (SPG PET) copolyester resin that is produced by polymerizing a monomer mixture comprising a mixture of spiroglycol, ethylene glycol and terephthalic acid and or an ester thereof (SPG PET) and having a glass transition temperature ($T_g$) of 85 to 130° C. For example, the amorphous high heat copolyester resin is produced by polymerizing a monomer mixture comprising of a mixture of spiroglycol and ethylene glycol in a molar ratio of 45 to 55, and terephthalic acid and/or an ester thereof. Useful SPG PET copolyesters include those described in U.S. Pat. No. 6,447,859. As provided by U.S. Pat. No. 6,447,859, these SPG PET polyester resins are produced by polymerizing a monomer mixture comprising a glycol component containing 5 to 60 mol % of a spiroglycol represented by Formula I:

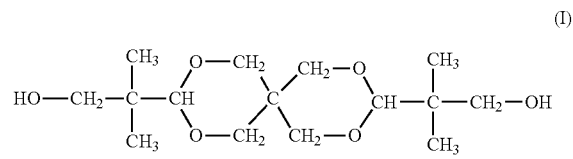 [SMILES: CC(C)(CO)C1OCC2(CO1)COC(C(C)(C)CO)OC2]

and 30 to 95 mol % of ethylene glycol, and a dicarboxylic acid component containing 80 to 100 mol % of terephthalic acid and/or an ester thereof, The effect of spiroglycol to ethylene glycol on $T_g$ in these compositions is summarized in Table 7. Example 7, in particular, has a $T_g$ of 110 with a spiroglycol to ethylene glycol 45:55 ratio. In an embodiment, the amorphous high heat copolyester resin component is an SPG PET having a $T_g$ of 90 to 125° C. In a further embodiment, the SPG PET has a $T_g$ of 95 to 120° C. In a further embodiment, the amorphous high heat copolyester resin component is an SPG PET that is available from Mitsubishi Gas Chemical Company as ALTESTER® S2000, ALTESTER® S3000, ALTESTER® S4500 exhibiting a $T_g$ of 95, 100, and 110, respectively. These amorphous high heat copolyesters are distributed by Perstorp as Akestra™ 90, Akestra™ 100, and Akestra™ 110, where 90, 100, and 110 is the $T_g$ of the material. See www.perstorp.com/en/products/plastic_materials/heat_resistant_plastic (last visited Dec. 3, 2015).

In another embodiment, the composition comprises 1.5 to 40 percent by weight of an amorphous high heat copolyester resin which is an SPG PET. In a further embodiment, the composition comprises 1.75 to 30 percent by weight of an amorphous high heat copolyester resin which is an SPG PET. In a further embodiment, the composition comprises 1.95 to 28 percent by weight of an amorphous high heat copolyester resin which is an SPG PET. In a further embodiment, the composition comprises 2 percent by weight of an amorphous high heat copolyester resin which is an SPG PET. In a further embodiment, the composition comprises 5 percent by weight of an amorphous high heat copolyester resin which is an SPG PET. In a further embodiment, the composition comprises 8 percent by weight of an amorphous high heat copolyester resin which is an SPG PET. In a further embodiment, the composition comprises 10 percent by weight of an amorphous high heat copolyester resin which is an SPG PET. In a further embodiment, the composition comprises 15 percent by weight of an amorphous high heat copolyester resin which is an SPG PET. In a further embodiment, the composition comprises 20 percent by weight of an amorphous high heat copolyester resin which is an SPG PET. In a further embodiment, the composition comprises 25 percent by weight of an amorphous high heat copolyester resin which is an SPG PET. In these and other embodiments, the SPG PET is Akestra™ 110.

Other Ingredients

In addition to the partially crystalline polyester component and amorphous high heat copolyester resin component, the composition also comprises an antioxidant, mold release agent, stabilizer, or a combination thereof.

Antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecyl-thiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid, stearyl-3-(3'5'-di-t-butyl-4-hydroxyphenyl) propionate or the like, or combinations comprising at least one of the foregoing antioxidants. Antioxidants are generally used in amounts of 0.1 to 1 percent by weight, based on 100 parts by weight of the total composition.

Stabilizers include, for example, organophosphites such as triphenyl phosphite, tris-(2,6-dimethylphenyl)phosphite, tris-(mixed mono- and di-nonylphenyl)phosphite, phosphorous acid or the like; phosphonates such as dimethylbenzene phosphonate or the like, phosphates such as monozinc phosphate, phosphoric acid or trimethyl phosphate, or the like, or combinations comprising at least one of the foregoing heat stabilizers. Heat stabilizers are generally used in amounts of 0.01 to 5 percent by weight, based on 100 parts by weight of the total composition. Plasticizers, lubricants, and/or mold release agents can also be used. There is considerable overlap among these types of materials, which include phthalic acid esters such as dioctyl-4,5-epoxy-hexahydrophthalate; tris-(octoxycarbonylethyl)isocyanurate; tristearin; poly-alpha-olefins; epoxidized soybean oil; silicones, including silicone oils; esters, for example, fatty acid esters such as alkyl stearyl esters, for example, methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly (ethylene glycol-co-propylene glycol) copolymers, or a combination comprising at least one of the foregoing glycol polymers, for example, methyl stearate and polyethylene-polypropylene glycol copolymer in a solvent; waxes such as beeswax, montan wax, and paraffin wax. Such materials are generally used in amounts of 0.001 to 1 percent by weight.

In addition to the partially crystalline polyester component, amorphous high heat copolyester resin component, and antioxidant, mold release agent, and stabilizer, or a combination thereof, the composition may contain additional, optional components such as fillers and other polymer resins such as polycarbonates.

The compositions may optionally comprise a reinforcing filler. For example, the reinforcing filler can comprise rigid fibers such as glass fibers, carbon fibers, metal fibers, ceramic fibers or whiskers such as wollastonite, polymeric fibers such as tetrafluoroethylene or aramid fibers, and the like. Glass fibers typically have a modulus of greater than or equal to about 6,800 megaPascals, and can be chopped or continuous. The glass fiber can have various cross-sections, for example, round, trapezoidal, rectangular, square, crescent, bilobal, trilobal, and hexagonal.

In one embodiment, glass is preferred, especially glass that is relatively soda free. Fibrous glass filaments comprised of lime-alumino-borosilicate glass, which is also known as "E" glass, are often especially preferred. Glass fiber is added to the composition to greatly increase the flexural modulus and strength, albeit making the product more brittle. The glass filaments can be made by standard processes, e.g., by steam or air blowing, flame blowing and mechanical pulling. The preferred filaments for plastic reinforcement are made by mechanical pulling. For achieving optimal mechanical properties fiber diameter between 6-20 microns can be used with a diameter of from 10-15 microns being preferred. In preparing the molding compositions it is convenient to use the fiber in the form of chopped strands of from about ⅛" (3 mm) to about ½" (13 mm) long although roving can also be used. In articles molded from the compositions, the fiber length is typically shorter presumably due to fiber fragmentation during compounding of the composition. The length of such short glass fibers present in final molded compositions is less than about 4 mm. The fibers can be treated with a variety of coupling agents to improve adhesion to the resin matrix. Preferred coupling agents include; amino, epoxy, amide or mercapto functionalized silanes. Organometallic coupling agents, for example, titanium or zirconium based organometallic compounds, can also be used. Other preferred sizing-coated glass fibers are commercially available from Owens Corning Fiberglass as, for example, OCF K filament glass fiber 183F.

In another embodiment, long glass fibers can be used, wherein a continuous glass fiber bundle containing thousands of glass fiber monofilaments having a diameter in the range, 6-24 μm, specifically 8-18 μm is impregnated with melted PBT polyester. After cooling, the impregnated bundle is cut into pellets having a length of >5 mm, specifically, above >9 mm, as prepared by the application of a process known as the pullout or pultrusion process. For impregnation, a high flow PCT polyester of the present invention can be used in order to improve the wetting rate of the filaments to make long glass fiber pellets. These pellets can be incorporated into the polyester compositions of the invention to get long fiber glass-reinforced polyester compositions. The length of long glass fiber present in molded composition prepared by this method is typically greater than that prepared by incorporation of short fibers and predominant portion of the long glass fibers present have a length >4 mm in the molded part. Such long fiber glass reinforced compositions can be used for different molding techniques such as injection molding, compression molding, thermoforming and the like. As in the case of short fibers, the long fibers can also be treated with a variety of coupling agents to improve adhesion to resin. For those skilled in the art, a continuous process such as pushtrusion technique for direct incorporation of long glass fibers in high flow polyester compositions will also be possible.

The glass fibers can be blended first with the polyalkylene terephthalate and then fed to an extruder and the extrudate cut into pellets; or, in a preferred embodiment, they can be separately fed to the feed hopper of an extruder. In a highly preferred embodiment, the glass fibers can be fed downstream in the extruder to minimize attrition of the glass. Generally, for preparing pellets of the composition set forth herein, the extruder is maintained at a temperature of approximately 230° C. to 280° C. The pellets so prepared when cutting the extrudate can be one-fourth inch long or less. As stated previously, such pellets contain finely divided uniformly dispersed glass fibers in the composition. The dispersed glass fibers are reduced in length as a result of the shearing action on the chopped glass strands in the extruder barrel.

In some applications, it can be desirable to treat the surface of the fiber, in particular a glass fiber, with a chemical coupling agent to improve adhesion to a thermoplastic resin in the composition. Examples of useful coupling agents are alkoxy silanes and alkoxy zirconates. Amino, epoxy, amide, or thio functional alkoxy silanes are especially useful. Fiber coatings with high thermal stability are preferred to prevent decomposition of the coating, which could result in foaming or gas generation during processing at the high melt temperatures required to form the compositions into molded parts.

The reinforcing filler, for example a glass fiber, is present in the composition in an amount from 0.1 to 40 percent by weight, or 5 to 35 percent by weight, specifically from 10 to 30 percent by weight, more specifically from 15 to 25 percent by weight, and more specifically, from 18 to 22 percent by weight. In these and other embodiments, the glass is $SiO_2$-fiborous glass (10 mm length, 13 micrometer diameter).

In still other embodiments, the compositions optionally additionally comprise a particulate (non-fibrous) organic filler, which can impart additional beneficial properties to the compositions such as thermal stability, increased density, stiffness, and/or texture. Exemplary particulate fillers are inorganic fillers such as alumina, amorphous silica, aluminosilicates, mica, clay, talc, glass flake, glass microspheres, metal oxides such as titanium dioxide, zinc sulfide, ground quartz, and the like.

In some embodiments, the reinforcing filler, for example glass fibers, is used in combination with flat, plate-like filler, for example talc, mica or flaked glass. Typically, the flat, plate-like filler has a length and width at least ten times greater than its thickness, where the thickness is from 1 to about 1000 microns. Combinations of rigid fibrous fillers with flat, plate-like fillers can reduce warp of the molded article. One specific particulate filler is talc, in particular a talc filler having an average largest dimension of less than 50 micrometers. In addition, or in the alternative, the filler can have a median particle size of less than 50 micrometers. In an embodiment, the equivalent spherical diameter of the particle is used to determine particle size. Use of these types of filler provides molded articles having both low shrinkage and a smooth surface finish. Use of these types of filler can also aid the crystallization of the polyester, and increase heat resistance of the composition. Such talc materials are commercially available from Barretts Minerals Inc. under the trade name ULTRATALC® 609.

The composition may also optionally comprise a polycarbonate or mixture of polycarbonates in addition to the other components. The terms "polycarbonate" and "polycarbonate polymer" are widely understood by those skilled in the art to mean compositions having repeating structural carbonate units of the formula:

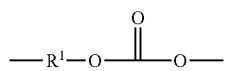

in which at least about 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula: -$A^1$-$Y^1$-$A^2$- wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O_2)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, wherein $R^1$ is as defined above. Dihydroxy compounds suitable in an interfacial reaction include the dihydroxy compounds of formula (A) as well as dihydroxy compounds of the formula HO-$A^1$-$Y^1$-$A^2$-OH wherein $Y^1$, $A^1$ and $A^2$ are as described above. Also included are bisphenol compounds of the general formula:

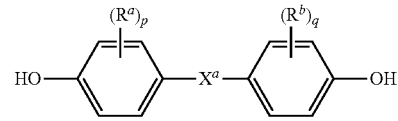

wherein $R^a$ and $R^b$ each represent a halogen atom or a monovalent hydrocarbon group and may be the same or different; p and q are each independently integers of 0 to 4; and $X^a$ represents one of the groups of the formula:

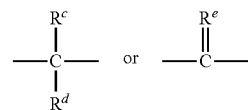

wherein $R^c$ and $R^d$ each independently represent a hydrogen atom or a monovalent linear or cyclic hydrocarbon group and Re is a divalent hydrocarbon group.

Some illustrative, non-limiting examples of suitable dihydroxy compounds include the following: resorcinol, hydroquinone, 4,4'-dihydroxybiphenyl, 1,6-dihydroxynaphthalene, 2,6-dihydroxynaphthalene, bis(4-hydroxyphenyl) methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 1,1-bis (hydroxyphenyl)cyclopentane, 1,1-bis(4-hydroxyphenyl) cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4- hydroxyphenyl)propane, 2,2-bis(3-allyl-4-hydroxyphenyl) propane, 2,2-bis(3-methoxy-4-hydroxyphenyl)propane, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2-phenyl-3,3-bis(4-hydroxyphenyl)phthalimidine (PPPBP), 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds. Specific examples of the types of bisphenol compounds that may be represented by formula (3) include 1,1-bis(4-hydroxyphenyl)methane, 1,1-bis(4-hydroxyphenyl)ethane, 2,2-bis(4-hydroxyphenyl) propane (hereinafter "bisphenol-A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, and 1,1-bis(4-hydroxy-t-butylphenyl) propane. Combinations comprising at least one of the foregoing dihydroxy compounds may also be used.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha,alpha-dimethyl benzyl) phenol), trimesic acid, and benzophenone tetracarboxylic acid. The branching agents may be added at a level of about 0.05 weight percent (weight percent) to about 2.0 weight percent. All types of polycarbonate end groups are contemplated as being useful in the polycarbonate composition, provided that such end groups do not significantly affect desired properties of the thermoplastic compositions. Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformate of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

Rather than utilizing the dicarboxylic acid per se, it is possible, and sometimes even desired, to employ the reactive derivatives of the acid, such as the corresponding acid halides, in particular the acid dichlorides and the acid dibromides. Thus, for example, instead of using isophthalic acid, terephthalic acid, or mixtures thereof, it is possible to employ isophthaloyl dichloride, terephthaloyl dichloride, and mixtures thereof.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or a $C_{6-18}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl⁻, Br, a $C_{1-8}$ alkoxy group or a $C_{6-18}$ aryloxy group. An effective amount of a phase transfer catalyst may be about 0.1 to about 10 weight percent based on the weight of bisphenol in the phosgenation mixture. In another embodiment an effective amount of phase transfer catalyst may be about 0.5 to about 2 weight percent based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

"Polycarbonates" and "polycarbonate polymers" as used herein further includes blends of polycarbonates with other copolymers comprising carbonate chain units. An exemplary copolymer is a polyester carbonate, also known as a copolyester-polycarbonate. Such copolymers further contain, in addition to recurring carbonate chain units of the formula:

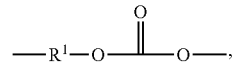

repeating units of the formula:

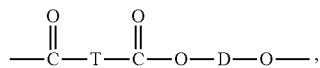

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to about 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of the formula:

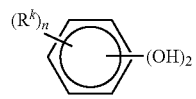

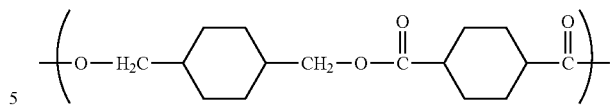

wherein each $R^k$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by this formula include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is about 10:1 to about 0.2:9.8. In another specific embodiment, D is a 02-6 alkylene radical and T is p-phenylene, m-phenylene, naphthalene, a divalent cycloaliphatic radical, or a mixture thereof. This class of polyester includes the poly(alkylene terephthalates).

In other embodiments, poly(alkylene terephthalates) may be used. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters. Also contemplated are the above polyesters with a minor amount, e.g., from about 0.5 to about 10 percent by weight, of units derived from an aliphatic diacid and/or an aliphatic polyol to make copolyesters. Copolymers comprising alkylene terephthalate repeating ester units with other ester groups may also be useful. Useful ester units may include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate). Poly(cycloalkylene diester)s may also include poly(alkylene cyclohexanedicarboxylate)s. Of these, a specific example is poly(1,4-cyclohexane-dimethanol-1,4-cyclohexanedicarboxylate) (PCCD), having recurring units of formula:

wherein, as described using formula (6), D is a 1,4-cyclohexanedimethylene group derived from 1,4-cyclohexanedimethanol, and T is a cyclohexane ring derived from cyclohexanedicarboxylate or a chemical equivalent thereof, and may comprise the cis-isomer, the trans-isomer, or a combination comprising at least one of the foregoing isomers.

In one embodiment, the composition comprises about 0.1 to about 50 percent by weight of polycarbonate. In another embodiment, the composition comprises 15 to 45 parts by weight of a polycarbonate. In another embodiment, the composition comprises 20 to 40 parts by weight of a polycarbonate. In another embodiment, the composition comprises 30 to 40 parts by weight of a polycarbonate. In these and other embodiments, the polycarbonate is amorphous bisphenol A polycarbonate homopolymer having a molecular weight of 23,000 g/mol, (using polystyrene standards), which is available from SABIC Innovative Plastics as LEXAN™. For example, the composition may further comprise 0.1 to 50 weight percent of an amorphous polycarbonate or polycarbonate blend. The polycarbonate may for example be a bisphenol A polycarbonate having aryl hydroxyl end-groups.

Composition

As indicated above, in one aspect, the invention is directed to a thermoplastic resin composition, comprising:
  from 10 to 80 weight percent of a partially crystalline polyester component selected from the group consisting of poly(butylene terephathalate, poly(ethylene terephthalate), poly(butylene terephthalate) copolymers, and poly(ethylene terephthalate) copolymers, or combinations thereof;
  from 1.5 to 40 weight percent of an amorphous high heat copolyester resin that is produced by polymerizing a monomer mixture comprising a mixture of spiroglycol, ethylene glycol and terephthalic acid and or an ester thereof (SPG PET) and having a glass transition temperature ($T_g$) of 85 to 130° C.; and
  from 0.01 to 5 weight percent of an antioxidant, mold release agent, stabilizer, or a combination thereof.

In one embodiment of this aspect, the thermoplastic resin composition comprises In a further embodiment, the composition comprises:
  from 5 to 75 percent by weight of the partially crystalline polyester component and 1.75 to 20 percent by weight of an amorphous high heat copolyester resin which is an SPG PET;
  10 to 70 percent by weight of the partially crystalline polyester component and 1.95 to 18 percent by weight of an amorphous high heat copolyester resin which is an SPG PET;
  15 to 65 percent by weight of the partially crystalline polyester component and 1.95 to 28 percent by weight of an amorphous high heat copolyester resin which is an SPG PET;
  20 to 60 percent by weight of the partially crystalline polyester component; and 1.95 to 28 percent by weight of an amorphous high heat copolyester resin which is an SPG PET; and 30 to 60 percent by weight of the partially crystalline polyester component and 1.95 to 28 percent by weight of an amorphous high heat copolyester resin which is an SPG PET.

In these and other embodiments, the partially crystalline polyester component is PBT, such as PBT having a molecular weight of 66,000 g/mol, using polystyrene standards and an intrinsic viscosity of 0.66 cm$^3$/g as measured in a 60:40 mixture of phenol/tetrachloroethane and the SPG PET is Akestra™ 110.

In another embodiment of this aspect, an article having from 0.1 up to and including 4.0 mm thickness and molded from the composition has:
- a near-infrared transmission at 980 nm of greater than 57%; and
- a heat deflection temperature of 95 to 150° C. according to ISO 75A at 1.8 MPa surface stress.

In another embodiment of this aspect, an article having from 0.1 up to and including 2.0 mm thickness and molded from the composition has:
- a near-infrared transmission at 980 nm of greater than 57%; and
- a heat deflection temperature of 95 to 150° C. according to ISO 75A at 1.8 MPa surface stress.

In another embodiment of this aspect, an article having 2.0 mm thickness and molded from the composition has:
- a near-infrared transmission at 980 nm of greater than 57%; and
- a heat deflection temperature of 95 to 150° C. according to ISO 75A at 1.8 MPa surface stress.

In a further embodiment of any of the previous embodiments, the composition further comprises 0.1 to 50 weight percent of an amorphous polycarbonate or polycarbonate blend. The amorphous polycarbonate is an amorphous bisphenol A polycarbonate homopolymer having a molecular weight of 23,000 g/mol, (using polystyrene standards), which is available from SABIC Innovative Plastics as LEXAN™. In another further embodiment, the composition comprises 15 to 45 parts by weight of a polycarbonate. In another further embodiment, the composition comprises 20 to 40 parts by weight of a polycarbonate. In another further embodiment, the composition comprises 30 to 40 parts by weight of a polycarbonate.

In a further embodiment of any of the previous embodiments, the composition further comprises 0.1 to 40 percent by weight of a reinforcing filler, for example a glass fiber. In another further embodiment, the composition comprises 5 to 35 percent by weight of glass fiber. In another further embodiment, the composition comprises 10 to 30 percent by weight of glass fiber. In another further embodiment, the composition comprises 15 to 25 percent by weight of glass fiber. In another further embodiment, the composition comprises 18 to 22 percent by weight of glass fiber. In these and other embodiments, the glass is SiO$_2$-fiborous glass (10 mm length, 13 micrometer diameter).

In a further embodiment, the composition comprises:
- from 30 to 40 weight percent of poly(butylene terephathalate);
- from 4 to 6 weight percent of spiroglycol modified poly(ethylene terephthalate) (molar ratio of spiroglycol to ethylene glycol is 55 to 45) and terephthalic acid or an ester thereof and having a $T_g$ of 85 to 115; and
- from 0.05 to 2 weight percent of an antioxidant, mold release agent, stabilizer, or a combination thereof.

In a further embodiment, the composition comprises:
- from 30 to 40 weight percent of poly(butylene terephathalate);
- from 4 to 6 weight percent of spiroglycol modified poly(ethylene terephthalate) (molar ratio of spiroglycol to ethylene glycol is 55 to 45) and terephthalic acid or an ester thereof and having a $T_g$ of 85 to 115;
- from 0.05 to 2 weight percent of an antioxidant, mold release agent, stabilizer, or a combination thereof; and
- from 30 to 35 weight percent of amorphous bisphenol A polycarbonate homopolymer.

In a further embodiment, the composition comprises:
- from 30 to 40 weight percent of poly(butylene terephathalate);
- from 4 to 6 weight percent of spiroglycol modified poly(ethylene terephthalate) (molar ratio of spiroglycol to ethylene glycol is 55 to 45) and terephthalic acid or an ester thereof and having a $T_g$ of 85 to 115;
- from 0.05 to 2 weight percent of an antioxidant, mold release agent, stabilizer, or a combination thereof;
- from 30 to 35 weight percent of amorphous bisphenol A polycarbonate homopolymer; and In a further embodiment, the composition comprises:
- from 30 to 40 weight percent of poly(butylene terephathalate);
- from 4 to 6 weight percent of spiroglycol modified poly(ethylene terephthalate) (molar ratio of spiroglycol to ethylene glycol is 55 to 45) and terephthalic acid or an ester thereof and having a $T_g$ of 85 to 115;
- from 0.05 to 2 weight percent of an antioxidant, mold release agent, stabilizer, or a combination thereof;
- from 30 to 35 weight percent of amorphous bisphenol A polycarbonate homopolymer; and
- from 15 to 25 weight percent of fibrous glass.

In these and other embodiments, the poly(butylene terephathalate) can be PBT 195; the SPG-PET can be Akestra™ 110; the polycarbonate can be amorphous bisphenol A polycarbonate homopolymer having a molecular weight of 23,000 g/mol, as measured using polystyrene standards, wherein the amount of Fries rearrangement is about 5400 ppm; and the glass fiber is SiO$_2$-fiborous glass (10 mm length, 13 micrometer diameter).

In another aspect, the invention is directed to a process for preparing an article that has a laser-transmissive part and a laser-absorbing part, wherein the laser-transmissive part comprises the composition of claim 1 and the laser-absorbing part comprises a thermoplastic composition comprising an NIR-absorbing colorant; wherein at least one portion of a surface of the laser-transmissive part being in physical contact with at least a portion of the laser-absorbing part, the process further comprising applying laser radiation to the laser-transmissive part, wherein the radiation passes through the laser-transmissive part and the radiation is absorbed by the laser-absorbing part so that sufficient heat is generated to effectively weld the laser-transmissive part to the laser-absorbing part.

In one embodiment of the process the laser-absorbing part comprises polycarbonate, polyester, polycarbonate copolymers, and combinations thereof.

In another embodiment, the laser-absorbing part comprises a bisphenol A polycarbonate having aryl hydroxyl end-groups.

In another embodiment, the laser-absorbing part comprises a NIR absorbing material selected from the group including organic dyes, metal oxides, mixed metal oxides, complex oxides, metal sulfides, metal borides, metal carbonates, metal sulfates, metal nitrides, lanthanum hexaboride, cesium tungsten oxide, indium tin oxide, antimony tin oxide, indium zinc oxide, and combinations thereof.

In another embodiment, the NIR absorbing material is present in the thermoplastic composition of the laser-absorbing part in an effective amount from 0.00001 to 5 weight %, based on total weight of the laser-weldable composition.

In another embodiment, the colorant is carbon black.

In another aspect, the invention is directed to a laser welded, molded article comprising a first laser-transmissive article welded to a second laser-absorbing article, wherein the first part comprises a product consisting of:
a. from 10 to 60 weight percent of a partially crystalline polyester component selected from poly(butylene terephthalate, poly(ethylene terephthalate), poly(butylene terephthalate) copolymers, poly(ethylene terephthalate) copolymers, and combinations thereof as described herein;
b. from 10-50 weight percent amorphous polycarbonate as described herein;
c. from 5 to 50 weight percent of a filler as described herein;
d. from 0.01 to 5 weight percent of an antioxidant, mold release agent, stabilizer, or a combination thereof as described herein;
e. from 1.5 to 40 weight percent of copolyester prepared by melt polymerization, amorphous polyester produced by polycondensation of a monomer mixture comprising of diol component containing spiroglycol and ethylene glycol (in a molar ratio of 45 to 55, respectively) and dicarboxylic acid component containing terephthalic acid and/or an ester thereof (SPG PET) terephthalic acid and/or an ester thereof (SPG PET), as described herein; and
wherein the composition when molded into an article having a 2.0 mm thickness, offers a NIR transmission at 980 nm of greater than 57%.

In one embodiment, of the laser welded, molded article comprising a first laser-transmissive article welded to a second laser-absorbing article, the first part comprises a product consisting of:
a. from 25 to 55 weight percent of a partially crystalline polyester component selected from poly(butylene terephthalate, poly(ethylene terephthalate), poly(butylene terephthalate) copolymers, poly(ethylene terephthalate) copolymers, and combinations thereof as described herein;
b. from 25-55 weight percent amorphous polycarbonate as described herein;
c. from 15 to 25 weight percent of a filler as described herein;
d. from 0.1 to 2 weight percent of an antioxidant, mold release agent, stabilizer, or a combination thereof as described herein;
e. from 2 to 10 weight percent of copolyester prepared by melt polymerization, amorphous polyester produced by polycondensation of a monomer mixture comprising of diol component containing spiroglycol and ethylene glycol (in a molar ratio of 45 to 55, respectively) and dicarboxylic acid component containing terephthalic acid and/or an ester thereof (SPG PET) terephthalic acid and/or an ester thereof (SPG PET), as described herein; and
wherein the composition when molded into an article having a 2.0 mm thickness, offers a NIR transmission at 980 nm of greater than 57%.

In one embodiment, of the laser welded, molded article comprising a first laser-transmissive article welded to a second laser-absorbing article, the first part comprises a product consisting of:
a. from 30 to 40 weight percent of a partially crystalline polyester component selected from poly(butylene terephathalate, poly(ethylene terephthalate), poly(butylene terephthalate) copolymers, poly(ethylene terephthalate) copolymers, and combinations thereof as described herein;
b. from 30-40 weight percent amorphous polycarbonate as described herein;
c. from 18 to 22 weight percent of a filler as described herein;
d. from 0.1 to 2 weight percent of an antioxidant, mold release agent, stabilizer, or a combination thereof;
e. from 4 to 6 weight percent of copolyester prepared by melt polymerization, amorphous polyester produced by polycondensation of a monomer mixture comprising of diol component containing spiroglycol and ethylene glycol (in a molar ratio of 45 to 55, respectively) and dicarboxylic acid component containing terephthalic acid and/or an ester thereof (SPG PET) terephthalic acid and/or an ester thereof (SPG PET); and
wherein the composition when molded into an article having a 2.0 mm thickness, offers a NIR transmission at 980 nm of greater than 57%.

In another embodiment of this aspect, an article having from 0.1 up to and including 2.0 mm thickness and molded from the composition has:
a near-infrared transmission at 980 nm of greater than 57%; and
a heat deflection temperature of 95 to 150° C. according to ISO 75A at 1.8 MPa surface stress.

The following examples illustrate the present invention, but are not meant to be the limitations to the scope thereof.

EXAMPLES

The materials shown in Table 1 were used in this study.

TABLE 1

Materials Used.

| Component | Chemical Description | Source |
|---|---|---|
| PBT 195 | Poly(1,4-butylene-terephthalate), (Mw = 66,000 g/mol, using polystyrene standards) | SABIC Innovative Plastics |
| PBT 315 | Poly(1,4-butylene-terephthalate), (Mw = 115,000 g/mol, using polystyrene standards) | SABIC Innovative Plastic |
| SPG PET (Akestra ™110) | Spiroglycol modified PET (molar ratio of spiroglycol to ethylene glycol is 55 to 45) and terephthalic acid or an ester thereof | Perstorp and Mistubishi Gas Chemical Company |
| PC172X | Amorphous bisphenol A polycarbonate homopolymer (Mw = 23,000 g/mol, using polystyrene standards), prepared by melt process, amorphous. The amount of Fries rearrangement is high (about 5400 ppm) | LEXAN ™ SABIC Innovative Plastics |

TABLE 1-continued

Materials Used.

| Component | Chemical Description | Source |
|---|---|---|
| PC175 | Bisphenol A polycarbonate homopolymer (Mw = 23,000 g/mol, using polystyrene standards), prepared by interfacial process, amorphous. The amount of Fries rearrangement is under 100 ppm | LEXAN ™ SABIC Innovative Plastics |
| PPC resin | Amorphous poly(ester-carbonate), bisphenol A based poly(phthalate-carbonate) containing 80% isophthalate-terephthalate ester units (Mw = 28,500 g/mol, using polystyrene standards) | LEXAN ™ SABIC Innovative Plastics |
| PCTG | poly(cyclohexanedimethylene terephthalate)-co-poly(ethylene terephthalate) comprising greater than 50 mol % to 99.9 mol % of poly(1,4-cyclohexanedimethylene terephthalate | Eastman Eastar 10179 |
| PCT | poly(cyclohexanedimethylene terephthalate) | Eastman PCT Thermx 13787 |
| PCCD | poly(1,4-cyclohexane-dimethanol-1,4-cyclohexanedicarboxylate) | Eastman Neostar(TM) Copolyester 19972 |
| AO1010 | Pentaerythritol tetrakis (3,5-di-tert-butyl-4-hydroxyhydrocinnamate) | IRGANOX 1010 Ciba Specialty Chemicals |
| Glass Fiber | SiO$_2$-fiborous glass (10 mm length, 13 micrometer diameter) | NIPPON Electric Glass T120 |
| MZP | Monozinc phosphate-2-hydrate | Chemische Fabriek |
| PETS | Pentaerylthritol tetrastearate | Lonza, Inc. |
| Paraffin Wax | Paraffin-hydrocarbon mixture | Honeywell |

Preparation

PBT, PC and SPG PET resin were melt blended in the presence of processing aids, glass fibers, acid quenchers and on a Werner & Pfleider 25 mm twin screw extruder according to the conditions depicted in Table 2. Molten polymer strands were cooled in a water batch and pelletized, dried for 2 hrs at 120° C. after which 60 mm×60 mm plaques were molded (thickness: 2.0 mm).

TABLE 2

Extrusion and Molding Processing Conditions.

| Extrusion Profile | | | Molding Profile | | |
|---|---|---|---|---|---|
| Intake Zone Temp | (° C.) | 50 | Hopper Temp | (° C.) | 40 |
| Zone 1 Temp | (° C.) | 160 | Zone 1 Temp | (° C.) | 240 |
| Zone 2 Temp | (° C.) | 260 | Zone 2 Temp | (° C.) | 250 |
| Zone 3 Temp | (° C.) | 260 | Zone 3 Temp | (° C.) | 260 |
| Zone 3 Temp | (° C.) | 260 | Nozzle Temp | (° C.) | 255 |
| Zone 4 Temp | (° C.) | 260 | Mold Temp | (° C.) | 70 |
| Zone 5 temp | (° C.) | 260 | Screw Speed | (rpm) | 25 |
| Zone 6 Temp | (° C.) | 260 | Back Pressure | (bar) | 5 |
| Zone 7 Temp | (° C.) | 260 | Switch point | (mm) | 7 |
| Zone 8 Temp | (° C.) | 260 | Injection Speed | (mm · s$^{-1}$) | 25 |
| Zone 9 Temp | (° C.) | 275 | Holding Time | (s) | 15 |
| Screw Speed | (rpm) | 300 | Cooling Time | (s) | 20 |
| Throughput | (kg · h$^{-1}$) | >20 | Approx. Cycle Time | (s) | 35 |
| Vacuum 1 | (bar) | max | | | |

Testing

Heat deflection temperature, MVR and Izod impact values are determined on molded samples in accordance with the methods shown in Table 3.

TABLE 3

Test Methods.

| Test | Description | Unit |
|---|---|---|
| Melt Volume Rate (MVR) | MVR was determined at 250° C. using a 2.16 kg weight, at 6 and 18 minutes, respectively, over 10 minutes according to ISO 1133. | cm$^3$/10 min |
| Heat Deflection Temperature | HDT was measured at 1.8 MPa and/or 0.45 MPa on the flat side of a 4-mm thick bar according to ISO 75A. | ° C. |
| Izod Impact | Izod Impact tests were performed on un-notched samples according to ISO 180, at 23° C. using a pendulum energy of 5.5 J. | kJ/m$^2$ |

Transmission and haze measurements were performed on BYK-Gardner haze-gard dual. The near-infrared (NIR) transmission data was measured in the middle (point of intersection of two diagonals) of 2.0 mm thick molded parts and collected on a Perkin-Elmer Lambda 950 equipped with a 15 cm integrating sphere. Transmission data measured at 980 nm are reported as it corresponds the operating wavelength of the lasers used in transmission laser welding. Laser transmission welding test was performed on the laser light transmitting test pieces Ex.2, Ex.4, Ex.5-7 (60 mm×60 mm×2.0 mm; Table 4) clamped onto the laser light absorbing test pieces TS A (60 mm×60 mm×2.5 mm; Table 4) to yield laser-welded products after irradiation though the upper layer with a diode laser (980 nm) with a beam diameter of 1.4 mm. The power and scanning speeds are shown in the tables.

The laser-welded test pieces were sawn into strips having approximately 20 mm width and subjected to tensile strength test using a tensile tester (Lloyd draw bench: LR30K, manufactured by Lloyd Instrumentals) at a pulling speed of 5 mm/min. The weld strength was calculated as the maximum load at break divided by the width of the test piece.

Results

Examples 1-7, Comparative Examples 1-2 are shown in Table 4. Example 8, Comparative Example 3 and Test Sample A are shown in Table 5.

TABLE 4

Comparative Example 1-2, Examples 1-7.

| Component | C.Ex.1 | C.Ex.2 | Ex.1 | Ex.2 | Ex.3 | Ex.4 | Ex.5 | Ex.6 | Ex.7 |
|---|---|---|---|---|---|---|---|---|---|
| PBT 195 | 39.69 | 39.19 | 38.69 | 37.20 | 35.71 | 34.71 | 32.22 | 39.69 | 39.69 |
| PBT 315 | — | — | — | — | — | — | — | — | — |
| PC172X | 40 | 39.50 | 39 | 37.49 | 35.98 | 34.98 | 32.47 | 35.0 | 30 |
| AO1010 | 0.06 | 0.06 | 0.06 | 0.06 | 0.06 | 0.06 | 0.06 | 0.06 | 0.06 |
| Glass Fiber | 20 | 20 | 20 | 20 | 20 | 20 | 20 | 20 | 20 |
| MZP | 0.05 | 0.05 | 0.05 | 0.05 | 0.05 | 0.05 | 0.05 | 0.05 | 0.05 |
| PETS | 0.2 | 0.2 | 0.2 | 0.2 | 0.2 | 0.2 | 0.2 | 0.2 | 0.2 |
| SPG PET | — | 1 | 2 | 5 | 8 | 10 | 15 | 5 | 10 |
| Paraffin Wax | — | — | — | — | — | — | — | — | — |
| Carbon Black | — | — | — | — | — | — | — | — | — |
| Total (%) | 100 | 100 | 100 | 100 | 100 | 100 | 100 | 100 | 100 |

TABLE 5

Comparative Example 3, Examples 8 and Test Sample A.

| Component | C. Ex. 3 | Ex. 8 | TS A |
|---|---|---|---|
| PBT 195 | 34.69 | 32.45 | 70.64 |
| PBT 315 | — | — | 28.7 |
| PC172X | 35.0 | 32.74 | — |
| AO1010 | 0.06 | 0.06 | 0.06 |
| Glass Fiber | 30 | 30 | — |
| MZP | 0.05 | 0.05 | — |
| PETS | 0.2 | 0.2 | — |
| SPG PET | — | 4.5 | — |
| Paraffin Wax | — | — | 0.1 |
| Carbon Black | — | — | 0.5 |
| Total (%) | 100 | 100 | 100 |

The compositions were processed and tested as described above. Results are shown in Table 6 and Table 7.

TABLE 6

Testing Results for Comparative Examples 1-2 and Examples 1-7.

| Property | | C.Ex.1 | C.Ex.2 | Ex.1 | Ex.2 | Ex.3 | Ex.4 | Ex.5 | Ex.6 | Ex.7 |
|---|---|---|---|---|---|---|---|---|---|---|
| NIR transmission (%) at 980 nm (Thickness = 2.0 mm) | | 56 | 57 | 68 | 76 | 80 | 83 | 87 | 73 | 75 |
| Haze (%) | | 100 | — | — | 97 | — | 85 | 67 | 100 | 97 |
| Transmission (%) | | 43 | — | — | 53 | — | 66 | 75 | 44 | 49 |
| MVR | 2.16 kg/250° C. 360 s | 15 | 15 | 15 | 15 | 15 | 15 | 14 | 13 | 17 |
| MVR | 2.16 kg/250° C. 1080 s | 16 | 16 | 16 | 16 | 15 | 14 | 14 | 16 | 17 |
| HDT (° C.) | 1.8 MPa | 110 | 109 | 107 | 104 | 101 | 99 | 95 | 106 | 103 |
| Izod (kJ/m$^2$) | 23° C. | 34 | 34 | 34 | 33 | 31 | 30 | 28 | 32 | 31 |

TABLE 7

Testing Results for Comparative Example 3 and Example 8 and Test Sample A

| Property | | C. Ex. 3 | Ex. 8 | TS A |
|---|---|---|---|---|
| NIR transmission (%) at 980 nm (Thickness = 2.0 mm) | | 60 | 70 | |
| MVR | 2.16 kg/250° C. 360 s | 12 | 12 | |
| MVR | 2.16 kg/250° C. 1080 s | 12 | 13 | |
| HDT (° C.) | 1.8 MPa | 116 | 113 | |
| Izod (kj/m$^2$) | 23° C. | 39 | 40 | |

The experimental results in Table 6 illustrate that SPG PET in the present invention significantly influences the laser transparency of the resin. Surprisingly, the transparency to near-infrared (NIR) light increases with respect to increasing SPG PET content equal to or greater than 2% in compositions described in Ex.1-7 in comparison with C.Ex.1 and C.Ex.2. These results suggest that the use of an amorphous SPG modified PET polyester in the indicated amounts imparts unexpected high transmission values in the near-infrared region while maintaining the thermal and impact properties compared to C.Ex.1. For instance, Ex.1-7, exhibited a heat deflection temperature and NIR transmission at 980 nm that were each greater or equal to 95° C. and 68%, respectively.

The results shown in Table 7 demonstrates that the addition of SPG PET to a 30% glass filled PC/PBT blend composition results in a significant improvement in transmission in the near-infrared region without impairing the thermal and impact resistance. Ex.8 exhibited 10% higher near-infrared transmission compared to C.Ex.3. Moreover, heat deflection temperature, and un-notched Izod impact was not significantly affected by the incorporation of SPG PET.

Ex.2 & Ex.4-7, indicating that the blends consisting of SPG PET can be processed more robustly.

Table 8 shows various 20% glass filled blends of PBT with (co)-polyesters, polycarbonate, and polyphthalate carbonate polycarbonate copolymer. The compositions were processed and tested as described above. Results are shown in Table 9.

TABLE 8

Comparative Example 4-11 and Example 9-10.

| Component | C.Ex.4 | C.Ex.5 | C.Ex.6 | C.Ex.7 | C.Ex.8 | C.Ex.9 | C.Ex.10 | C.Ex.11 | Ex.9 | Ex.10 |
|---|---|---|---|---|---|---|---|---|---|---|
| PBT 195 | 79.69 | 59.69 | 59.69 | 59.69 | 59.69 | 59.69 | 61.69 | 45.69 | 59.69 | 54.69 |
| PC172X | — | 20.0 | — | — | — | — | — | 34.0 | — | — |
| PC175 | — | — | 20.0 | — | — | — | — | — | — | — |
| PCTG | — | — | — | 20.0 | — | — | — | — | — | — |
| PCT | — | — | — | — | 20.0 | — | — | — | — | — |
| PCCD | — | — | — | — | — | 20.0 | — | — | — | — |
| PPC | — | — | — | — | — | — | 18 | — | — | — |
| SPG PET | — | — | — | — | — | — | — | — | 20.0 | 25 |
| AO1010 | 0.06 | 0.06 | 0.06 | 0.06 | 0.06 | 0.06 | 0.06 | 0.06 | 0.06 | 0.06 |
| Glass Fiber | 20 | 20 | 20 | 20 | 20 | 20 | 20 | 20 | 20 | 20 |
| MZP | 0.05 | 0.05 | 0.05 | 0.05 | 0.05 | 0.05 | 0.05 | 0.05 | 0.05 | 0.05 |
| PETS | 0.2 | 0.2 | 0.2 | 0.2 | 0.2 | 0.2 | 0.2 | 0.2 | 0.2 | 0.2 |
| Total (%) | 100 | 100 | 100 | 100 | 100 | 100 | 100 | 100 | 100 | 100 |

TABLE 9

Testing Results for Comparative Example 4-11 and Example 9-10.

| Property | | C.Ex.4 | C.Ex.5 | C.Ex.6 | C.Ex.7 | C.Ex.8 | C.Ex.9 | C.Ex.10 | C.Ex.11 | Ex.9 | Ex.10 |
|---|---|---|---|---|---|---|---|---|---|---|---|
| NIR transmission (%) (Thickness = 2.0 mm) | | 21 | 33 | 31 | 27 | 20 | 19 | 44-61* | 54 | 38 | 56 |
| MVR | 2.16 kg/250° C. 360 s | 32 | 24 | 23 | 8 | 21 | 23 | 15 | 18 | 25 | 23 |
| | 2.16 kg/250° C. 1080 s | 33 | 24 | 24 | 8 | 23 | 24 | 17 | 19 | 25 | 24 |
| HDT | 0.45 MPa | 220 | 208 | 208 | 212 | 208 | 218 | 199 | 167 | 205 | 196 |
| | 1.8 MPa | 197 | 151 | 156 | 164 | 172 | 187 | 107 | 111 | 136 | 110 |
| Izod (kJ/m$^2$) | 23° C. | 32 | 32 | 35 | 35 | 34 | 15 | 42 | 39 | 30 | 32 |

*The NIR transparency significantly varied within the molded plaques, ranging from 44% on the top to 61% at the bottom of the molded plaques, with an observed standard deviation of batch-to-batch of 3.4.

Without being bound by theory, these findings suggest that SPG PET assists compatibilization of PC and PBT phases in the blend, leading to slow crystallization of the PBT resin from the melt upon molding and hence giving high transparency in the molded parts and increased transmission to laser light in the NIR region. Further support for the above-mentioned conclusion is given by the increased half-crystallization time in Ex.4 and Ex.5 (14.9 and 19.4 min, respectively) compared to base resin C.Ex.1 (10.7 min). Moreover, in the present invention, addition of SPG PET in appropriate amounts such that the refractive index of the resin matches the refractive index of glass leads to an improvement of surface aesthetics of fiber-glass reinforced PC/PBT blends. As the data in Table 6 reveal, transmission values increases as SPG PET content in the resin composition increases, whereas the values for haze decreases with increasing loading of SPG PET. Lowest haze (67%) and highest transmission (75%) has been observed in the presence of 15% SPG PET (Ex.5).

Besides the fact that the presence of SPG PET increases the NIR light transmission, we also surprisingly found that batch-to-batch variation of the NIR transmission was considerably reduced. Standard deviation is reduced from 7.4 for the base composition (C.Ex.1) to on averaged 1.4 for The results in Table 9 demonstrates the effect of addition of various (co)-polyesters and polycarbonates on compositions comprising of PBT and 20% glass fibers. Surprisingly, incorporation of the copolyester SPG PET into the 20% glass filled PBT resin (Ex.9) resulted in a significant increase in the transparency to 38%, whereas the addition of other copolyesters only resulted in a near-infrared light transmissions of 27%, 20%, and 19% for C.Ex.7, 8 and 9, respectively.

As illustrated by C.Ex.5 and C.Ex.6, the blending in of amorphous polycarbonate resins with different aryl hydroxyl content due to thermal Fries rearrangements (approximately 5400 ppm for C.Ex.5 and <100 ppm for C.Ex.6) does not lead to the same level of improvement in the NIR transmission values (33 and 31%, respectively) as compared to Ex.9 (38%), while retaining excellent thermal properties with a HDT at 0.45 MPa of >200° C. The NIR transmission can be increased by increasing the polycarbonate content as is shown by comparing C.Ex.5 (33%) with C.Ex.11 (54%). However, compared to a SPG PET composition having a similar transmission of 56% (Ex.10) the heat properties are significantly better retained for Ex.10 compared to C.Ex.11 with a HDT of 167° C. compared to 196° C. at 0.45 MPa, respectively.

C.Ex.10 illustrates that the use of a polyphtalate carbonate polycarbonate copolymer having both ester and carbonate linkages can give thermal properties that compare to Ex.9 and Ex.10 (HDT at 0.45 MPa of 199° C. versus 205 and 196° C., respectively). However, the variation of the NIR transmission within the molded plaque/article ranges between 44 and 61% due to inconsistent crystallization in contrast to Ex.9 and Ex.10, making it an unsuitable solution for laser welding applications.

Laser Welding

Laser welding was conducted using Ex.2, Ex.4 and Ex.5-7 as the laser-transmitting part as described above. Results are illustrated in Table 10.

TABLE 10

Laser Welding Test and Tensile Strength Test Details.

| Laser transparent test piece | Laser absorbing test piece | Transmission at 980 nm (%) | Power (W) | Speed (mm/s) | Weld Strength (MPa) |
|---|---|---|---|---|---|
| C. Ex. 1 | TS A | 56 | 24 | 100 | 28 |
| Ex. 2 | TS A | 76 | 16 | 100 | 32 |
| Ex. 4 | TS A | 83 | 12 | 100 | 29 |
| Ex. 5 | TS A | 87 | 10 | 100 | 27 |
| Ex. 6 | TS A | 73 | 18 | 100 | 32 |
| Ex. 7 | TS A | 75 | 16 | 100 | 31 |

The benefit of the compositions in the present invention in laser transmission welding process is proved by the larger and consistent weld strength of the resin compositions of Ex.2, Ex.4 and Ex.5-7 containing SPG PET, compared to C.Ex.1 The higher NIR transmission affected by copolyester SPG PET facilitates the laser welding assembly process by allowing lower power output setting to be used versus the base resin formulation (C.Ex.1).

Alternatively, rather than using less power, faster speed can be reached shortening assembly cycle times (Table 11). The effects achieved in relation to laser-transparency increase are overall unexpectedly high and therefore entirely satisfactory.

TABLE 11

Laser Welding Test and Tensile Strength Test Details.

| Laser transparent test piece | Laser absorbing test piece | Power (W) | Speed (mm/s) Very Fast | Weld Strength (MPa) |
|---|---|---|---|---|
| Ex. 2 | TS A | 20 | 150 | 28 |
|  | TS A | 25 | 200 | 27 |
| Ex. 4 | TS A | 16 | 150 | 27 |
|  | TS A | 20 | 200 | 26 |

The foregoing invention has been described in some detail by way of illustration and example for purposes of clarity and understanding. The invention has been described with reference to various specific embodiments and techniques. It should be understood that many variations and modifications may be made while remaining within the spirit and scope of the invention. It will be obvious to one of skill in the art that changes and modifications may be practiced within the scope of the appended claims. The above description is intended to be illustrative and not restrictive. The scope of the invention should, therefore, be determined not with reference to the above description, but should instead be determined with reference to the following appended claims, along with the full scope of equivalents to which such claims are entitled.

The invention claimed is:

1. A thermoplastic resin composition, comprising:
   from 10 to 80 weight percent of a partially crystalline polyester component selected from the group consisting of terephthalate-derived polyesters, naphthalate derived polyesters, succinate-derived polyesters, and furanoate-derived polyesters; or combinations thereof;
   from 1.5 to 40 weight percent of an amorphous high heat copolyester resin that is produced by polymerizing a monomer mixture comprising a mixture of spiroglycol, ethylene glycol and terephthalic acid and/or an ester thereof (SPG PET) and having a glass transition temperature ($T_g$) of 85 to 130° C.; and
   from 0.01 to 5 weight percent of an antioxidant, mold release agent, stabilizer, or a combination thereof.

2. The composition of claim 1, further comprising 0.1 to 50 weight percent of an amorphous polycarbonate or polycarbonate blend.

3. The composition of claim 2, wherein the polycarbonate is a bisphenol A polycarbonate having aryl hydroxyl endgroups.

4. The composition of claim 1, further comprising 0.1 to 40 weight percent of a filler.

5. The composition of claim 4, wherein the filler is glass fiber.

6. The thermoplastic resin composition of claim 1, comprising
   from 30 to 60 weight percent of the partially crystalline polyester component;
   from 1.95 to 28 weight percent of the amorphous high heat copolyester resin;
   from 0.01 to 5 weight percent of the antioxidant, mold release agent, stabilizer, or a combination thereof;
   from 20 to 40 weight percent of an amorphous polycarbonate; and
   from 10 to 30 weight percent of a filler;
   wherein the partially crystalline polyester component is poly(butylene terephthalate);
   the amorphous high heat copolyester resin is produced by polymerizing the monomer mixture comprising the mixture of spiroglycol and ethylene glycol in the molar ratio of 45 to 55, and terephthalic acid and/or the ester thereof;
   the amorphous polycarbonate is a bisphenol A polycarbonate homopolymer; and
   the filler is glass fiber, and
   wherein an article having a 2.0 mm thickness and molded from the composition has a near-infrared transmission at 980 nm of greater than 57%.

7. The thermoplastic composition of claim 6, comprising
   from 30 to 40 weight percent of the partially crystalline polyester component;
   from 1.95 to 28 weight percent of the amorphous high heat copolyester resin;
   from 0.01 to 5 weight percent of the antioxidant, mold release agent, stabilizer, or a combination thereof;
   from 30 to 40 weight percent of the amorphous polycarbonate; and
   from 15 to 30 weight percent of the filler.

8. The thermoplastic composition of claim 1, comprising:
   from 30 to 40 weight percent of the partially crystalline polyester component which is poly(butylene terephathalate);
   from 4 to 6 weight percent of the amorphous high heat copolyester resin produced by polymerizing the monomer mixture comprising the mixture of spiroglycol and ethylene glycol in a molar ratio of 45 to 55, and terephthalic acid and/or an ester thereof and having a $T_g$ of 85 to 115° C.;

from 0.05 to 2 weight percent of the antioxidant, mold release agent, stabilizer, or a combination thereof;

from 30 to 35 weight percent of an amorphous polycarbonate which is a bisphenol A polycarbonate homopolymer; and from 15 to 25 weight percent of fibrous glass, wherein an article having a 2.0 mm thickness and molded from the composition has a near-infrared transmission at 980 nm of greater than 57%.

9. The thermoplastic composition of claim 8, wherein the poly(butylene terephthalate) has a molecular weight of 66,000 g/mol, using polystyrene standards and an intrinsic viscosity of 0.66 cm³/g as measured in a 60:40 mixture of phenol/tetrachloroethane.

10. The composition of claim 1, wherein the amorphous high heat copolyester is present in an amount of from 1.95 to 28 weight percent and an article having a 2.0 mm thickness and molded from the composition has:

a near-infrared transmission at 980 nm of greater than 57%; and a heat deflection temperature of 95 to 150° C. according to ISO 75A at 1.8 MPa surface stress.

11. The composition of claim 1, wherein the partially crystalline polyester component is selected from the group consisting of poly(butylene terephthalate), poly(ethylene terephthalate), poly(butylene terephthalate) copolymers, and poly(ethylene terephthalate) copolymers, or combinations thereof.

12. The composition of claim 1, wherein the partially crystalline polyester component is poly(butylene terephthalate).

13. The composition of claim 1, wherein the amorphous high heat copolyester resin is produced by polymerizing a monomer mixture comprising of a mixture of spiroglycol and ethylene glycol in a molar ratio of 45 to 55, and terephthalic acid and/or an ester thereof.

14. The thermoplastic composition of claim 1, comprising:

from 30 to 40 weight percent of the partially crystalline polyester component which is poly(butylene terephathalate);

from 4 to 6 weight percent of the amorphous high heat copolyester resin produced by polymerizing the monomer mixture comprising the mixture of spiroglycol and ethylene glycol in a molar ratio of 45 to 55, and terephthalic acid and/or an ester thereof and having a $T_g$ of 85 to 115° C.; and from 0.05 to 2 weight percent of the antioxidant, mold release agent, stabilizer, or a combination thereof.

15. A process for preparing an article that has a laser-transmissive part and a laser-absorbing part, wherein the laser-transmissive part comprises the composition of claim 1 and the laser-absorbing part comprises a thermoplastic composition comprising an NIR-absorbing colorant; wherein at least one portion of a surface of the laser-transmissive part being in physical contact with at least a portion of the laser-absorbing part, the process further comprising applying laser radiation to the laser-transmissive part, wherein the radiation passes through the laser-transmissive part and the radiation is absorbed by the laser-absorbing part so that sufficient heat is generated to effectively weld the laser-transmissive part to the laser-absorbing part.

16. The process of claim 15, wherein the laser-absorbing part comprises polycarbonate, polyester, polycarbonate copolymers, and combinations thereof.

17. The process of claim 16, wherein the laser-absorbing part comprises a bisphenol A polycarbonate having aryl hydroxyl end-groups.

18. The process of claim 17, wherein the laser-absorbing part comprises a NIR absorbing material selected from the group including organic dyes, metal oxides, mixed metal oxides, complex oxides, metal sulfides, metal borides, metal carbonates, metal sulfates, metal nitrides, lanthanum hexaboride, cesium tungsten oxide, indium tin oxide, antimony tin oxide, indium zinc oxide, and combinations thereof.

19. The process of claim 18, wherein the NIR absorbing material is present in the thermoplastic composition of the laser-absorbing part in an effective amount from 0.00001 to 5 weight %, based on total weight of the laser-weldable composition.

20. A laser welded, molded article comprising a first laser-transmissive article welded to a second laser-absorbing article, wherein the first part comprises a product consisting of:

a. from 10 to 60 weight percent of a partially crystalline polyester component selected from the group consisting of terephthalate-derived polyesters, naphthalate-derived polyesters, succinate-derived polyesters, and furanoate-derived polyesters; or combinations thereof;

b. from 10-50 weight percent amorphous polycarbonate;

c. from 5 to 50 weight percent of a filler;

d. from 0.01 to 5 weight percent of an antioxidant, mold release agent, stabilizer, or a combination thereof;

e. from 1.5 to 40 weight percent of copolyester prepared by melt polymerization of a monomer mixture comprising of diol component containing spiroglycol and ethylene glycol in a molar ratio of 45 to 55 and dicarboxylic acid component containing terephthalic acid and/or an ester thereof (SPG PET); and wherein the composition when molded into an article having a 2.0 mm thickness, offers a NIR transmission at 980 nm of greater than 57%.

* * * * *